(12) United States Patent
Duan et al.

(10) Patent No.: US 9,542,444 B2
(45) Date of Patent: *Jan. 10, 2017

(54) SCALABLE MULTI-QUERY OPTIMIZATION FOR SPARQL

(71) Applicant: International Business Machines Corporation, Armonk, NY (US)

(72) Inventors: Songyun Duan, Pleseantville, NY (US); Anastasios Kementsietsidis, New York, NY (US); Wangchao Le, Salt Lake City, UT (US); Feifei Li, Salt Lake City, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,547

(22) Filed: Jan. 28, 2016

(65) Prior Publication Data
US 2016/0162549 A1 Jun. 9, 2016

Related U.S. Application Data

(63) Continuation of application No. 13/691,666, filed on Nov. 30, 2012, now Pat. No. 9,280,583.

(51) Int. Cl.
*G06F 17/30* (2006.01)
(52) U.S. Cl.
CPC ... *G06F 17/30469* (2013.01); *G06F 17/30442* (2013.01); *G06F 17/30598* (2013.01); *G06F 17/30958* (2013.01); *G06F 17/30463* (2013.01)

(58) Field of Classification Search
CPC ............ G06F 17/30442; G06F 17/30463; G06F 17/30469; G06F 17/30598; G06F 17/30958
See application file for complete search history.

(56) References Cited

U.S. PATENT DOCUMENTS

| | | |
|---|---|---|
| 8,204,903 B2 | 6/2012 | Bowers et al. |
| 8,886,631 B2 | 11/2014 | Abadi et al. |
| 2006/0074833 A1 | 4/2006 | Gardner et al. |
| 2006/0200438 A1 | 9/2006 | Schloming |
| 2006/0235823 A1 | 10/2006 | Chong |
| 2007/0250473 A1 | 10/2007 | Larson et al. |
| 2010/0131490 A1 | 5/2010 | Lamb et al. |
| 2010/0161680 A1 | 6/2010 | Atre et al. |
| 2011/0289063 A1 | 11/2011 | Radlinski et al. |
| 2012/0047124 A1 | 2/2012 | Duan et al. |

(Continued)

OTHER PUBLICATIONS

A A. Diwan et al., "Scheduling and caching in multi-query optimization", In COMAD, 2006, 10 pages.

(Continued)

*Primary Examiner* — Rehana Perveen
*Assistant Examiner* — Tiffany Thuy Bui
(74) *Attorney, Agent, or Firm* — Patent Portfolio Builders PLLC (57) ABSTRACT

Multiquery optimization is performed in the context of RDF/SPARQL. Heuristic algorithms partition an input batch of queries into groups such that each group of queries can be optimized together. The optimization incorporates an efficient algorithm to discover the common sub-structures of multiple SPARQL queries and an effective cost model to compare candidate execution plans. No assumptions are made about the underlying SPARQL query engine. This provides portability across different RDF stores.

16 Claims, 4 Drawing Sheets

(a) Query $Q_1$   (b) Query $Q_2$   (c) Query $Q_3$   (d) Query $Q_4$

(56) References Cited

U.S. PATENT DOCUMENTS

2014/0075161 A1 3/2014 Zhang et al.

OTHER PUBLICATIONS

A. K. Jain et al., "Data clustering: a review", ACM Comput. Surv., 1999, 60 pages.
A. Kementsietsidis et al., "Scalable multi-query optimization for exploratory queries over federated scientific databases", PVLDB, 2008, 12 pages.
A. Polleres, "From SPARQL to rules (and back)", In WWW, 2007, 10 pages.
C. Bizer and A. Schultz, "The berlin sparql benchmark", International Journal on Semantic Web and Information Systems, 2009, 28 pages.
D. J. Abadi et al., "Scalable semantic web data management using vertical partitioning". In VLDB, 2007, 12 pages.
E. Tomita and T. Kameda, "An efficient branch-and-bound algorithm for finding a maximum clique with computational experiments", Journal of Global Optimization, 2007, 12 pages.
G. Ianni et al., "Dynamic querying of mass-storage rdf data with rule-based entailment regimes", In ISWC, 2009, 16 pages.
H. Z. Yang and P. Larson, "Query transformation for PSJ-queries" PVLDB, 1987. J. Koch, "Enumerating all connected maximal common subgraphs in two graphs", Theoretical Computer Science, 2001, 10 pages.
J. W. Raymond and P. Willett, "Maximum common subgraph isomorphism algorithms for the matching of chemical structures", Journal of Computer-Aided Molecular Design, 16:521-533, 2002, 13 pages.
K. O'Gorman et al., "Multiple query optimization by cache-aware middleware using query teamwork", In ICDE, 2002, 1 page.
K. Shim et al. "Improvements on a heuristic algorithm for multiple-query optimization", Data and Knowledge Engineering, 12(2):197-222, 1994, 26 pages.
M. Atre et al. , "Matrix "bit" loaded: A scalable lightweight join query processor for rdf data", In WWW, 2010, 10 pages.
M. Hong et al., "Massively multi-query join processing in publish/subscribe systems", In SIGMOD, 2007, 12 pages.
M. Schmidt et al., "Foundations of SPARQL query optimization", In ICDT, 2010, 30 pages.
M. Stocker et al., "SPARQL basic graph pattern optimization using selectivity estimation", In WWW, 2008, 10 pages.
N. Bruno et al., "Navigation- vs. index-based XML multi-query processing", In ICDE, 2003, 12 pages.
N. N. Dalvi et al., "Pipelining in multi-query optimization", In PODS, 2001, 12 pages.
N. Preda et al., "Active knowledge : Dynamically enriching rdf knowledge bases by web services", In SIGMOD, 2010, 12 pages.
N. Trigoni et al, "Multiquery optimization for sensor networks", In Distributed Computing in Sensor Systems (DCOSS), LNCS, 14 pages.
P. R. Ostergard, "A fast algorithm for the maximum clique problem", Discrete Applied Mathematics, pp. 195-205, 2002, 11 pages.
P. Roy et al, "Efficient and extensible algorithms for multi query optimization", In SIGMOD, 2000, 12 pages.
P. Zhao and J. Han, "On graph query optimization in large networks", In PVLDB, 2010, 12 pages.
R. Angles and C. Gutierrez, "The expressive power of SPARQL", In ISWC, 2008, 36 pages.
T. K. Sellis, "Multiple-query optimization", ACM Trans. Database Syst., 13(1):23-52, 1988, 5 pages.
T. Neumann and G. Weikum, "RDF-3X: a RISC-style engine for RDF", In PVLDB, 2008, 13 pages.
T. Neumann and G. Weikum, "Scalable join processing on very large RDF graphs", In SIGMOD, 2009, 13 pages.
W. Le et al., "Rewriting queries on sparql views", In WWW, 2011, 13 pages.
Y. Guo et al., "LUBM: A benchmark for OWL knowledge base systems", Journal of Web Semantics, 2005, 34 pages.
Y. Zhao et al., "Simultaneous optimization and evaluation of multiple dimensional queries", In SIGMOD, 1998, 12 pages.
C. Weiss et al., "Hexastore: sextuple indexing for semantic web data management", PVLDB, Aug. 23-28, 2008, pp. 1008-1019, 12 pages.
A.E. Tomita and T. Seki, "An efficient branch-and-bound algorithm for finding a maximum clique", Discrete Mathematics and Theoretical Computer Science, LNCS, 2003, pp. 278-289, 12 pages.
J. Park and A. Segev, "Using common subexpressions to optimize multiple queries", 4th International Conference on Data Engineering, Los Angeles, CA, Feb. 2-5, 1988, 12 pages.
P. Vismara and B. Valery, "Finding maximum common connected subgraphs using clique detection or constraint satisfaction algorithms", Modelling, Computation and Optimization in Information Systems and Management Sciences, pp. 358-368, 2008, 10 pags.
T. Sellis and S. Ghosh, "On the multiple-query optimization problem", IEEE Trans. Knowl. Data Eng., 2(2):262-266, Jun., 5 pages.
I. Koch, "Enumerating connected maximal common subgraphs in two graphs"; Theoretical Computer Science; [downloaded on Jul. 7, 2016 from internet at http://www.sciencedirect.com/science/article/pii/S0304397500002863]; Jan. 30, 2001; pp. 1-30.
M. Schmidt, et al.; "SP2Bench; A SPARQL Performance Benchmark"; Freiburg University; airXiv:0806.4627v2 [cs.DB]; [downloaded on Jul. 7, 2016 from itnernet at https://arxiv.org/pdf/0806.4627.pdf]; 2009; pp. 1-19; Freiburg, Germany.

(a) A Type 2 query (b) Equivalent Type 1 rewritten queries

SCALABLE MULTI-QUERY OPTIMIZATION FOR SPARQL

CROSS-REFERENCE TO RELATED APPLICATIONS

The present application is a continuation of co-pending U.S. patent application Ser. No. 13/691,666 filed Nov. 30, 2012. The entire disclosure of that application is incorporated herein by reference.

FIELD OF THE INVENTION

The present invention relates to data storage and data queries.

BACKGROUND OF THE INVENTION

Resource Description Framework (RDF) is the de-facto standard for data representation on the World Wide Web. The amount of RDF data from disparate domains grows rapidly. For instance, the Linked Open Data (LOD) initiative integrates billions of entities from hundreds of sources. Just one of these sources, the DBpedia dataset, describes more than 3.64 million things using more than 1 billion RDF triples, of which 385 million are extracted from the English edition of Wikipedia.

With the proliferation of RDF data, effort has been devoted to building RDF stores that efficiently answer graph pattern queries, i.e., SPARQL. This included migrating the schema-relax RDF data to relational data, e.g., Virtuoso, Jena SDB, Sesame and 3store, among others and building generic RDF stores from scratch, e.g., Jena TDB, RDF-3X, 4store and Sesame Native. As RDF data are schema-relax and graph pattern queries in SPARQL characterize many joins for better scalability and efficiency, a full spectrum of techniques, from physical design of storage to query evaluation, have been proposed to address the new challenges. These techniques include vertical partitioning for relational backend, side way information passing for scalable join processing and various compressing and indexing techniques for smaller memory footprint.

With the infrastructure being built, more advanced applications are being developed. These applications include integrating and harvesting knowledge on the Web as well as rewriting queries for fine-grain access control and inference. In such applications, a SPARQL query is often rewritten into a batch of equivalent SPARQL queries for evaluation. As the semantics of the rewritten SPARQL queries in a common batch are overlapped, the issue of multi-query optimization (MQO) is addressed in the context of RDF and SPARQL. The MQO for SPARQL queries is NP-hard, given that MQO for relational queries is NP-hard and the established equivalence between SPARQL and relational algebra. Indeed, the MQO techniques developed in relational systems can be applied to address this MQO issue in SPARQL. For example, query plans can be represented in AND-OR directed acyclic graphs (DAGs), and heuristics used to partially materialize intermediate results that could result in a promising query throughput. Similar themes can be seen in a variety of contexts including relational queries, XQueries, aggregation queries and full-reducer tree queries.

These solutions, however, are hard to engineer practically into RDF query engines. First, the complexity stems from the physical design of RDF data itself. While indexing and storing relational data commonly conform to a carefully calibrated relational schema, many variances exist for RDF data, e.g., the giant triple table adopted in 3store and RDF-3X, the property table in Jena and using vertical partitioning to store RDF data. When combined with the disparate indexing techniques, the cost estimation for an individual query operator, the corner stone for any MQO technique, is highly error prone and store dependent. Moreover, SPARQL queries feature more joins than typical SQL queries. While existing techniques commonly root on exhausting query plans and look for the best in a tournament, comparing the cost for alternative plans becomes impractical in the context of SPARQL, as the error for selectivity estimation inevitably increases when the number of joins increases. Moreover, RDF is a very general data model, and knowledge and facts can be seamlessly harvested and integrated from various SPARQL endpoints on the Web. While a specialized MQO solution serves inside the optimizer of certain RDF stores, a generic MQO framework is desired that smoothly fits into any SPARQL endpoint and that is coherent with the design principle of RDF data model.

SUMMARY OF THE INVENTION

Exemplary embodiments of systems and methods in accordance with the present invention provide for MQO of SPARQL queries over RDF data while minimizing total query evaluation time. Query rewriting techniques are used to achieve desirable and consistent performance for MQO across different RDF stores. The RDF model offers a flexible graph representation for data, and the SPARQL language provides a convenient way to express graph-pattern queries. Common subqueries, i.e., cyclic graphs in essence, are identified and are rewritten with SPARQL in a meaningful way. Systems and methods in accordance with the present invention, work on top of any RDF engine and ensure that the underlying RDF stores can automatically cache and reuse such results. In addition, a full range of optimization techniques in different RDF stores and SPARQL query optimizers seamlessly support the MQO techniques of the present invention.

In accordance with the present invention, a generic technique for MQO in SPARQL is used that summarizes similarity in the (sub)structure of SPARQL queries and takes into account unique properties of SPARQL language. MQO is achieved through query rewriting built on algorithms for finding common substructures in SPARQL queries. In addition, efficient and effective optimizations are tailored to find common subqueries in a batch of SPARQL queries. A practical cost model is used that is determined both by the idiosyncrasies of the SPARQL language and by an empirical digest of how SPARQL queries are executed in existing RDF data management systems. Experimental results on large RDF datasets, e.g., close to 10 million triples, from different RDF stores convincingly demonstrate the efficiency and effectiveness of the multi-query optimization methods and systems in accordance with the present invention.

DETAILED DESCRIPTION

SPARQL is a pattern-matching query language. There are two types of SPARQL queries: Q:=SELECT RD WHERE GP and $Q_{OPT}$:=SELECT RD WHERE GP (OPTIONAL $GP_{OPT}$)$^+$. In these queries, GP is a set of triple patterns, i.e., triples involving both variables and constants and RD is the result description. Given an RDF data graph D, the triple pattern GP searches on D for a set of subgraphs of D, each of which matches the graph pattern in GP by binding pattern variables to values in the subgraph. The result description RD for both query types contains a subset of variables in the graph patterns, similar to a projection in SQL. The difference between the two types is clearly in the OPTIONAL clause. Unlike query Q, in the $Q_{OPT}$ query a subgraph of D might match not only the pattern in GP but also the pattern (combination) of GP and $GP_{OPT}$. While more than one OPTIONAL clauses are allowed, subgraph matching with D independently considers the combination of pattern GP with each of the OPTIONAL clauses. Therefore, with n OPTIONAL clauses in query $Q_{OPT}$, the query returns as results the subgraphs that match any of the n (GP+$GP_{OPT}$) pattern combinations, plus the results that match just the GP pattern.

TABLE 1

Input Data D

| Subj | pred | obj |
|---|---|---|
| p1 | name | "Alice" |
| p1 | zip | 10001 |
| p1 | mbox | alice@home |
| p1 | mbox | alice@work |
| p1 | www | http://home/alice |
| p2 | name | "Bob" |
| p2 | zip | "10001" |
| p3 | name | "Ella" |
| p3 | zip | "10001" |
| p3 | www | http://work/ella |
| p4 | name | "Tim" |
| p4 | zip | "11234" |

Input data D for a SPARQL query is illustrated in Table 1. A $Q_{OPT}$ over this input data is:

```
SELECT  ? name, ? mail, ? hpage
WHERE   { ? x name ? name, ? x zip 10001,
          OPTIONAL {? x mbox ? mail}
          OPTIONAL {? x WWW ? hpage }}
```

This query looks for triples whose subjects, each corresponding to a person, have the predicates name and zip, with the latter having the value 10001 as object. For these triples, the query returns the object of the name predicate. Due to the presence of the first OPTIONAL clause, the query also returns the object of predicatembox, if the predicate exists. Due to the second OPTIONAL clause, the query also independently returns the object of the predicate www, if the predicate exists. Evaluating the query over the input data D results in the output $Q_{OPT}$(D) illustrated in Table 2.

TABLE 2

Output $Q_{OPT}$(D)

| name | mail | hpage |
|---|---|---|
| "Alice" | alice@home | |
| "Alice" | alice@work | |
| "Alice" | | http://home/alice |
| "Bob" | | |
| "Ella" | | http://work/ella |

Figure 1:
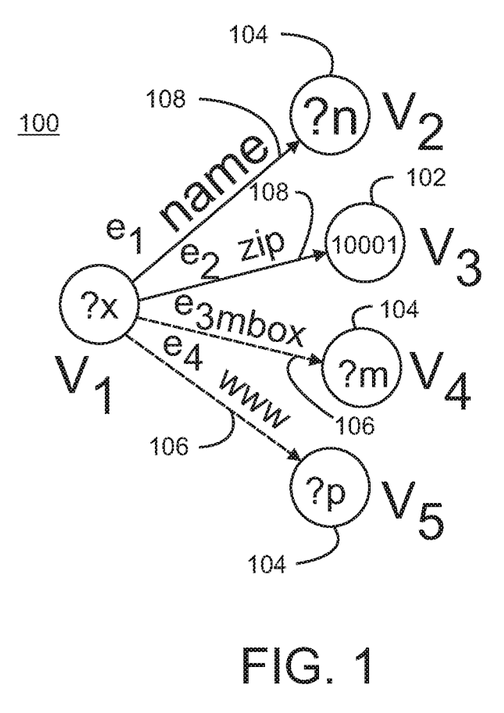
FIG. 1 is an embodiment of a query graph pattern for inputs queries in accordance with the present invention.

Referring to FIG. 1, an embodiment of a graphical representation of a query 100 is illustrated. A query graph pattern corresponding to its pattern GP (resp., GP (OPTIONAL $GP_{OPT}$)$^+$) is associated with each query Q ($Q_{OPT}$). Formally, a query graph pattern is a 4-tuple (V, E, ν, μ) where V and E stand for vertices and edges, and ν and μ are two functions which assign labels, i.e., constants and variables, to vertices and edges of GP respectively. Vertices represent the subjects and objects of a triple, and include constants 102 and variables 104. Edges represent predicates, with dashed edges 106 representing $GP_{OPT}$, and solid edges 108 representing required predicates. A graphical representation example for the query $Q_{OPT}$ given above is shown in FIG. 1. The query graph patterns GP and $GP_{OPT}$ are defined separately. GP is defined as (V, E, ν, μ), where V={$v_1$, $v_2$, $v_3$}, E={$e_1$, $e_2$} and the two naming functions are ν={$v_1$: $v_1 \to$? x, $v_2$:$v_2 \to$? n, $v_3$: $v_3 \to$10001} and μ={$\mu_1$:$e_1 \to$name, $\mu_2$: $e_2 \to$zip}. The two OPTIONALs are defined as $GP_{OPT1}$= (V', E', ν', μ'), where V'={$v_1$, $v_4$}, E'={$e_3$}, ν'={$v'_1$: $v_1 \to$? x, $v'_2$: $v_4 \to$? m}, μ'={$\mu'_1$: $e_3 \to$mbox}. Likewise, $GP_{OPT2}$=(V", E", ν", μ"), where V"={$v_1$, $v_5$}, E"={$e_4$}, ν"={$v"_1$: $v_1$ 1$\to$? x, $v"_2$: $v_5 \to$? p}, μ"={$\mu"_1$: $e_4 \to$www}.

The problem of MQO in SPARQL, from a query rewriting perspective, is defined as follows: Given a data graph G, and a set Q of Type 1 queries, compute a new set $Q_{OPT}$ of Type 1 and Type 2 queries such that: (i) |$Q_{OPT}$|≤|Q|; and (ii) evalTime($Q_{OPT}$)≤evalTime(Q). The number of optimized queries |$Q_{OPT}$| is set to be less than the initial number of queries |Q|. In addition, the result of the multi-query optimization is set to be less expensive to evaluate than executing the queries in Q. For simplicity, input queries are assumed to be of Type 1, while the output (optimized) queries are either of Type 1 or Type 2. Systems and methods in accordance with the present invention can be extended to accommodate cases when both query types are given as input and other more general SPARQL queries.

Figure 2:
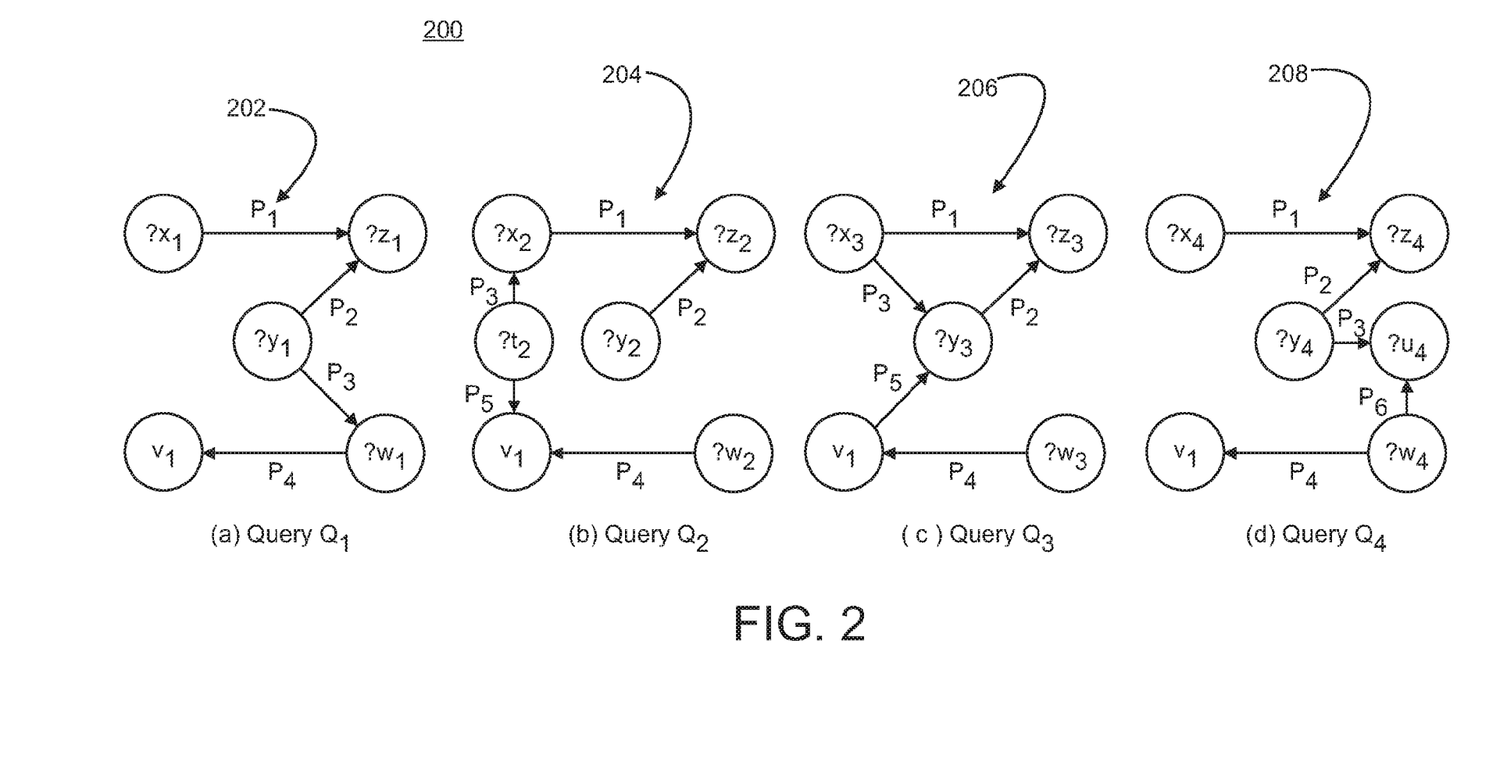
FIG. 2 is an embodiment of a plurality of query graph patterns to be cluster in accordance with the present invention.
Figure 3:
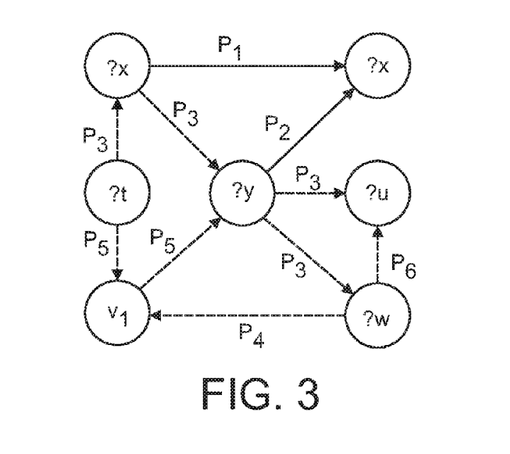
FIG. 3 is an embodiment of the combination of the plurality of query graph patterns of FIG. 2.

A simple example illustrates the types of optimizations envisioned. Referring to FIG. 2, a plurality of graph patterns 200 for queries of Type 1 is illustrated, a first graph pattern 202, a second graph pattern 204, a third graph pattern 206 and a fourth graph pattern 208. Referring to FIG. 3, a graph pattern for a Type 2 query $Q_{OPT}$ 300 that merges all four input queries from FIG. 2 into a single one is illustrated. To generate query $Q_{OPT}$, the largest common subquery in all four queries is identified. This subquery involves triples ? x $P_1$ ? z and ? y $P_2$ ? Z. The second largest common subquery involves only predicate $P_3$ or $P_4$. This common subquery constitutes the graph pattern GP of $Q_{OPT}$. The remaining subquery of each individual query generates an OPTIONAL clause in $Q_{OPT}$. By generating a query like $Q_{OPT}$, the triple patterns in GP of $Q_{OPT}$ are evaluated only one time, and the results are cached for evaluating the rest of the patterns, instead of being evaluated once for each input query. Intuitively, this is where the savings from the MQO comes. MQO here considers generic directed graphs. In addition, query optimization in accordance with the present invention uses SPARQL-specific constructs, like the OPTIONAL clause.

The above approach only considers query structures, without considering the evaluation cost. If the selectivity $\alpha(p)$ of each pattern p in the queries is known, the cost of each query Q or $Q_{OPT}$ is equal to the minimum selectivity of the patterns in GP, i.e., the cost of OPTIONAL patterns is ignored, which is motivated by how real SPARQL engines evaluate queries. Therefore, the cost for all four queries in FIG. 2 is respectively 4, 2, 4 and 4, scaled by a factor of 100. Executing all queries individually without optimization costs 4+2+4+4=14. The cost of the structure-based only optimized query in FIG. 3 is 9, resulting in a saving of approximately 30% according to the cost function. Now, the query resulting from optimizing along the second largest common subquery has a cost of only 4, yielding even more savings in spite of using a smaller structural overlap. Therefore, a clear benefit results from considering cost along with structure. Indeed, exemplary embodiments of systems and methods in accordance with the present invention utilize a structure and cost combined optimization algorithm that consistently outperforms solely structure-only optimizations.

An exemplary embodiment of a MQO algorithm in accordance with the present invention is illustrated as:

```
     Input: Set Q = {Q₁, ..., Qₙ}
     Output: Set Q_OPT of optimized queries
     // Step 1: Bootstrapping the query optimizer
1    Run k-means on Q to generate a set M = {M₁, ..., Mₖ} of k query
     groups;
     // Step 2: Determining query clusters
2    for each query group M ∈ M do
3        Initialize a set C = {C₁, ..., C_|M|} of |M| clusters;
4        for each query Qᵢ ∈ M, 1 ≤ i ≤ |M| do Cᵢ = Qᵢ;
5        while ∃ untested pair (Cᵢ, Cᵢ') with J_max (Cᵢ, Cᵢ') do
6            Let Q^iiⁱ = {Q₁^iiⁱ, ..., Q_m^iiⁱ} be the queries of Cᵢ ∪ Cᵢ';
7            Let S be the top-s most selective triple patterns in Q^iiⁱ (e.g.,
             |S| = 3);
             // Step 2.1: Building compact linegraphs
8            Let μ_∩ ← μ₁ ∩ μ₂ ... ∩ μ_m and τ = {∅};
9            for each query Q_j^iiⁱ ∈ Q^iiⁱ do
10               Build linegraph L(Q_j^iiⁱ) with only the edges in μ_∩;
11               Keep indegree matrix m_j⁻, outdegree matrix m_j⁺ for L(Q_j^iiⁱ);
12           for each vertex e defined in μ_∩ and μ_∩(e) ≠ ∅ do
13               Let I = m₁⁻[e] ∩ ... ∩ m_m⁻[e] and O = m₁⁺[e] ∩ ... ∩ m_m⁺[e];
14               if I = O = ∅ then μ_∩(e) ≝ ∅ and τ = τ ∪ {triple pattern with
                 e};
15           for L(GP_p); 1 ≤ j ≤ m do
16               Prune the L(GP_j) vertices not in μ_∩ and their incident edges;
             //Step 2.2: Building product graphs
17           Build L(GP_p) = L(GP₁) ⊗ L(GP₂) ⊗ ... ⊗ L(GP_m);
             // Step 2.3: Finding cliques in product graphs
18           {K₁, ..., K_r} = AllMaximalClique(L(GP_p));
19           if r = 0 then goto 5;
20           for each Kᵢ, i = 1, 2, ..., r do
21               find all Kᵢ', ⊆ Kᵢ having the maximal strong covering tree in Kᵢ;
22           sort SubQ = {K₁', ..., K_r'} ∪ τ in descending order by size;
23           Initialize K = ∅;
24           for each qᵢ ∈ SubQ, i = 1, 2, ..., t + |τ| do
25               if S ∩ qᵢ ≠ ∅ then Set K = qᵢ and break
26           if K ≠ ∅ then
27               Let C_tmp = Cᵢ ∪ Cᵢ' and cost(C_tmp) = cost(sub - query for K);
28               if cost(C_tmp) ≤ cost(Cᵢ) + cost(Cᵢ') then
29                   Put K with C_tmp;
30                   remove Cᵢ, Cᵢ' from C and add C_tmp;
     // Step 3: Generating optimized queries
31   for each cluster Cᵢ in C do
32       if a clique K is associated with Cᵢ then
33           Rewrite queries in Cᵢ using triple patterns in K;
34       Output the query into set Q_OPT;
35   return Q_OPT.
```

In the exemplary MQO algorithm of the present invention, a set $Q=\{Q_1, \ldots, Q_n\}$ of n queries over a graph G is accepted as the input, i.e., the batch of equivalent queries for evaluation. Without loss of generality, the sets of variables used in different queries are assumed to be distinct. The algorithm identifies whether there is a cost-effective way to share the evaluation of structurally-overlapping graph patterns among the queries in Q. At a high level, the algorithm partitions the input queries into groups, where queries in the same group are more likely to share common sub-queries and rewrites a number of Type 1 queries in each group to their correspondent cost-efficient Type 2 queries. The algorithm then executes the rewritten queries and distributes the query results to the original input queries along with a refinement.

Several challenges arise during the above process. There might be an exponential number of ways to partition the input queries. Thus a heuristic is needed to prune out the space of less optimized partitionings. In addition, an efficient algorithm is needed to determine potential common sub-queries for a given query group, and since different common sub-queries result in different query rewritings, a robust cost model is needed to estimate the amount of savings for each rewriting strategy.

Finding structural overlaps for a set of queries amounts to finding the isomorphic subgraphs among the corresponding query graphs. This process is computationally expensive as the problem is NP-hard in general. Therefore, these overlaps are identified only for groups of queries that will eventually be optimized, i.e., rewritten. This is accomplished by minimizing (eliminating) the computation of identifying common subgraphs for query groups that lead to less optimized MQO solutions. In one embodiment, a heuristic is used to quickly prune out subsets of queries that clearly share little in query graphs without executing the expensive step of computing their overlap. Thus, queries that do not have many predicates in common are pruned from further consideration for optimization.

The similarity metric for two queries is defined as the Jaccard similarity of their predicate sets. The rational is that if the similarity value of two queries is small, their structural overlap in query graphs is also small. Therefore, it is safe not to consider grouping such queries for MQO. This heuristic is implemented as a bootstrap step in line 1 above using k-means clustering with Jaccard as the similarity metric for an initial partitioning of the input queries into a set $\mathcal{M}$ of k query groups. The similarity metric identifies queries with substantial overlaps in their predicate sets, ignoring for now the structure and cost of these predicates.

In order to determine query clusters, with the k-means generated groups $\mathcal{M}$ as a starting point, the partitioning of queries is further refined based on their structural similarity and the estimated cost. To this end, each k-means generated group $M \in \mathcal{M}$ is considered in isolation since queries across groups are guaranteed to be sufficiently different. The following steps are then performed. In lines 5-30, structurally similar queries within M are merged incrementally through hierarchical clustering, and query clusters are generated such that each query cluster is optimized together, i.e., results in one Type 2 query. Initially, one singleton cluster $C_i$ is created for each query $Q_i$ of M (line 4). Given two clusters $C_i$ and $C_{i'}$, a determination is made as to whether it is cost-effective to merge the two query clusters into a single cluster, i.e., a single Type 2 query, or to keep the two clusters separate. From the previous iteration, the cost of the optimized queries is known for each of the $C_i$ and $C_{i'}$ clusters. To determine the cost of the merged cluster, the query is computed that results by merging all the queries in $C_i$ and $C_{i'}$ which requires the common substructure in the graph patterns of these queries to be computed and the cost of the optimized query generated from the merged clusters to be estimated. For the cost computation, preliminary work is conducted (line 7) by identifying the most selective triple patterns from the two clusters, where selectivity is estimated using known methods. The refinement of M might lead to more than one Type 2 query, one for each cluster of M.

While finding the maximum common subgraph for two graphs is known to be NP-hard, the challenge here is asymptotically harder as it requires finding the largest common substructures for multiple graphs. Existing solutions on finding common subgraphs also assume untyped edges and nodes in undirected graphs. But here, the graphs represent queries, and different triple patterns might correspond to different semantics, i.e., typed and directed. Therefore, the predicates and the constants associated with nodes are also being taken into consideration. This mix of typed, constant and variable nodes and edges is not typical in classical graph algorithms. Therefore, existing solutions can not directly apply for query optimization. Its presence requires additional logic and substantially complicates the optimization. Exemplary embodiments in accordance with the present invention, follow the principle of finding the maximal common edge subgraphs (MCES) and take into account the new challenges as well as efficiency and scalability for MQO of SPARQL. Methods and systems in accordance with the present invention utilize three sub-steps, which are illustrated as step 2.1 to 2.3 above. These sub-steps are transforming the input query graphs into the equivalent linegraphs representations, generating a product graph from the linegraphs and executing a tailored clique detection algorithm to find the maximal cliques in the product graph. A maximal clique corresponds to an MCES.

Figure 4:
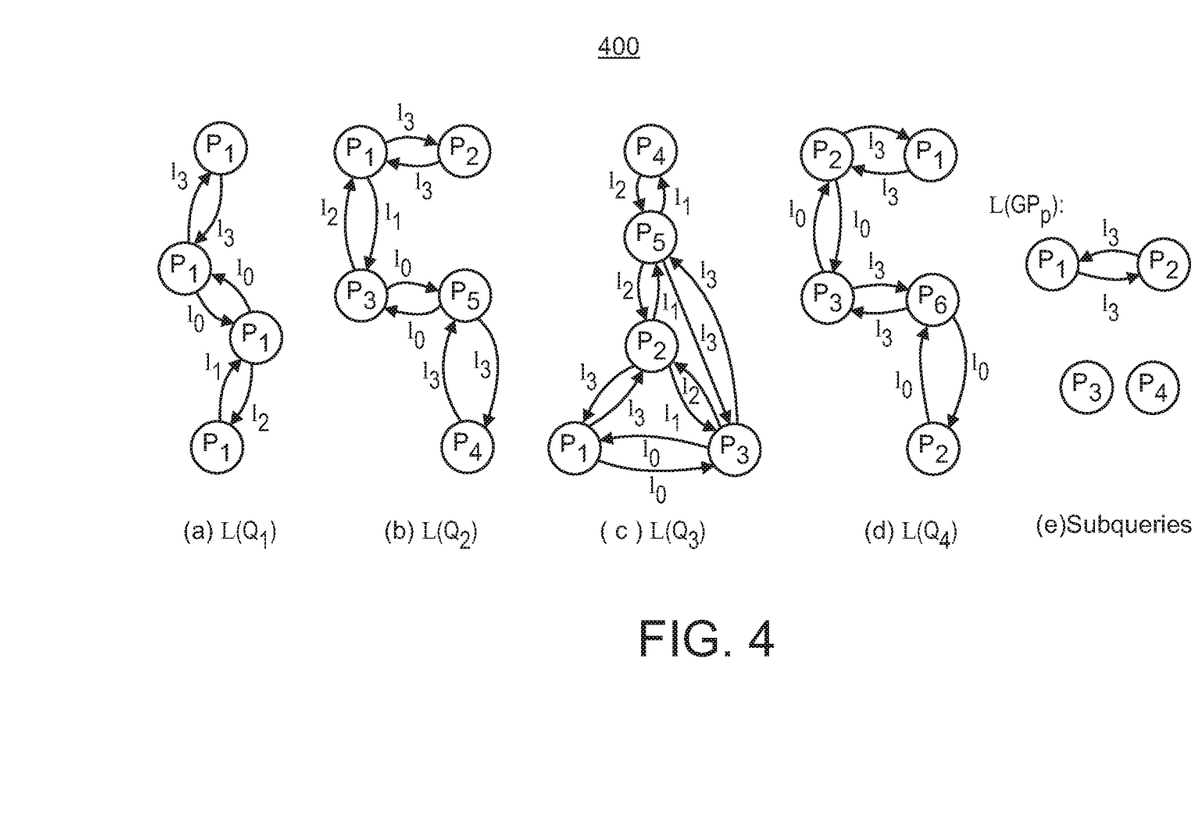
FIG. 4 is an embodiment of linegraphs and their common substructures for use in accordance with the structural clustering of the present invention.

To build compact line graphs, the linegraph $\mathcal{L}(G)$ of a graph G is constructed as a directed graph. Each node in $\mathcal{L}(G)$ corresponds to an edge in G, and there is an edge between two nodes in $\mathcal{L}(G)$ if the equivalent edges in G share a common node. Although it is straightforward to transform a graph into its linegraph representation, the context of multi-query optimization raises additional requirements for the linegraph construction. The linegraph of a query graph pattern is represented in a 4-tuple defined as $\mathcal{L}(G)=(V, E, \pi, \omega)$. During linegraph construction, in addition to the inversion of nodes and edges for the original query graph, the transformation of the present invention also assigns to each edge in the linegraph one of 4 labels, i.e., $\ell_i$ (i=0, 1, 2, 3). Specifically, for two triple patterns, there are 4 possible joins between their subjects and objects ($\ell_0$=subject–subject, $\ell_1$=subject–object, $\ell_2$=object–subject, $\ell_3$=object–object). The assignment of labels on linegraph edges captures these four join types, which is useful for pruning. Referring to FIG. 4, the linegraphs 400 corresponding to the four queries in FIG. 2 are illustrated.

The classical solution for finding common substructures of input graphs requires building Cartesian products on their linegraphs. This raises challenges in scalability when finding the maximum common substructure for multiple queries in one shot. To avoid the foreseeable explosion, fine-grained optimization, as illustrated in lines 8-16 above, is used to keep the linegraphs as small as possible so that only the most promising substructures are transformed into linegraphs, with the rest being temporarily masked from further processing.

To achieve this, queries in $Q^{ii'}$ pass through a two-stage optimization. In the first stage (lines 8-11 above), the common predicates in $Q^{ii'}$ are identified (line 8) by building the intersection $\mu_\cap$ for all the labels defined in the $\mu$'s, recalling that function u assigns predicate names to graph edges. Predicates that are not common to all queries can be safely pruned, since by definition they are not part of any common substructure, e.g., $P_5$ and $P_6$. While computing the intersection of predicates, the algorithm of the present invention checks for compatibility between the corresponding subjects and objects, so that samelabel predicates with different subjects/objects are not added into $\mu_\cap$. In addition, two adjacency matrices for a linegraph $\mathcal{L}(GP)$ are maintained, namely, the indegree matrix $m^-$ storing all incoming, and the outdegree matrix $m^+$ storing all outgoing edges from $\mathcal{L}(GP)$ vertices. For a vertex v, $m^-[v]$ and $m^+[v]$, respectively, are used to denote the portion of the adjacency matrices storing the incoming and outgoing edges of v. For example, the adjacency matrices for vertex $P_3$ in linegraph $\mathcal{L}(Q_1)$ of Fig. are $m_1^+[P_3]=[\emptyset, \ell_0, \emptyset, \ell_2, \emptyset, \emptyset]$, $m_1^-[P_3]=[\emptyset, \ell_0, \emptyset, \ell_1, \emptyset, \emptyset]$, while for linegraph $\mathcal{L}(Q_2)$ they are $m_2^+[P_3]=[\ell_2, \emptyset, \emptyset, \emptyset, \ell_0, \emptyset]$, $m_2^-[P_3]=[\ell_1, \emptyset, \emptyset, \emptyset, \ell_0, \emptyset]$.

In the second stage, i.e., lines 12-16, to further reduce the size of linegraphs, for each linegraph vertex e, the Boolean intersection is computed for the $m^-[e]$'s and $m^+[e]$'s from all linegraphs respectively (line 13). From $\mu_\cap$, e is pruned if both intersections equal $\emptyset$, and the triple pattern associated with e in a set $\tau$ (line 14) is set aside. Intuitively, this optimization acts as a look-ahead step in the algorithm, as it quickly detects the cases where the common sub-queries involve only one triple pattern (those in $\tau$). Moreover, it also improves the efficiency of the clique detection (steps 2.2 and 2.3) due to the smaller sizes of input linegraphs. Going back to the example, just by looking at the $m_1^-$, $m_1^+$, $m_2^-$, and $m_2^-$, it is easy to see that the intersection $\cap m_i^+[P_3]=\cap m_i^-[P_3]=\emptyset$ for all the linegraphs of FIG. 4. Therefore, the optimization of the present invention temporarily masks $P_3$ (so as $P_4$) from the expensive clique detection in the following two steps.

Step 2.2 provides for building product graphs. The product graph $\mathcal{L}(GP_p):=(V_p, E_p, \pi_p, \omega_p)$ of two linegraphs, $\mathcal{L}(GP_1):=(V_1, E_1, \pi_1, \omega_1)$ and $\mathcal{L}(GP_2):=(V_2, E_2, \pi_2, \omega_2)$, is denoted as $\mathcal{L}(GP_p):=(GP_1)\otimes \mathcal{L}(GP_2)$. The vertices in $V_p$ are defined on the Cartesian product of $V_1$ and $V_2$. For the purposes of using product graphs in multi-query optimization, the standard definition is optimized with the additional requirement that vertices paired together have the same label, i.e., predicate. That is, $V_p:=\{(v_1, v_2)|v_1\in V_1 \hat{} v_2\in V_2 \hat{} \pi_1(v_1)=\pi_2(v_2)\}$, with the labeling function defined as $\pi_p:=\{\pi_p(v)|\pi_p(v)=\pi_1(v_1)$, with $v=(v_1, v_2)\in V_p\}$. In terms of the product edges, the standard definition is used that creates edges in the product graph between two vertices $(v_{1i}, v_{2i})$ and $(v_{1j}, v_{2j})$ in $V_p$ if either (i) the same edges $(v_{1i}, v_{1j})$ in $E_1$, and $(v_{2i}, v_{2j})$ in $E_2$ exist or (ii) no edges connect $v_{1i}$ with $v_{1j}$ in $E_1$, and $v_{2i}$ with $v_{2j}$ in $E_2$. The edges due to (i) are termed as strong connections, while those for (ii) as weak connections.

Since the product graph for two linegraphs conforms to the definition of linegraph, the product for multiple linegraphs is recursively built (line 17). Theoretically, there is an exponential blowup in size when the product for multiple linegraphs is constructed. Using the optimizations in Steps 2.1 and 2.2, the algorithm of the present invention accommodates tens to hundred of queries, and the product graph is efficiently computed. FIG. 4 shows at (e) the product linegraph $\mathcal{L}(GP_p)$ for the running example.

Step 2.3 finds cliques in product graphs. A maximal clique with a strong covering tree, i.e., a tree only involving strong connections, equals to an MCES-a maximal common sub-query-in essence. In addition, cost effective common sub-queries are found. To verify if the found common sub-query is selective, it is checked against the set $\mathcal{L}$ from line 7 of selective query patterns. In the algorithm, all maximal cliques in the product graph are found (line 18). A plurality of efficient algorithms exists for this process and is known in the art. For each discovered clique, its sub-cliques with the maximal strong covering trees are identified (line 21). For the $\mathcal{L}(GP_p)$ in FIG. 4 at (e), it results in one clique (itself), i.e., $K'_1=\{P_1, P_2\}$. As the cost of sub-queries is another dimension for query optimization, the algorithm looks for the substructures that are both large in size, i.e., the overlap of query graph patterns, and that correspond to selective common sub-queries. Therefore, SubQ (contributed by K's and τ, line 22) is sorted by their sizes in descending order, and then is looped through the sorted list from the beginning and stopped at the first substructure that intersects $S$ (lines 22-25), i.e., $P_4$ in the example. Then, if it is cost effective, line 28, the queries are merged whose common sub-query is reflected in K, and their corresponding clusters are also merged into a new cluster, while remembering the found common sub-query (lines 26-30). The algorithm repeats lines 5-30 until every possible pair of clusters have been tested, and no new cluster can be generated.

After the clusters are finalized, the algorithm outputs the query representing each cluster (lines 31-34). The result from evaluating $Q_{OPT}$ over the data is a superset of evaluating the input queries Q. Therefore, the results are filtered and distributed from the execution of $Q_{OPT}$. This necessitates one more step of parsing the result of $Q_{OPT}$, refer to the output of the example in Table 2, which checks each row of the result against the RD of each query in Q. Notice that the result description $RD_{OPT}$ is always the union of $RD_i$s from the queries being optimized. It was assumed that variable names of different queries are disjoint. As in Table 2, the result of a Type 2 query might have empty (null) columns corresponding to the variables from the OPTIONAL clause. Therefore, a row in the result of $RD_{OPT}$ might not conform to the description of every $RD_i$. The goal of parsing is to identify the valid overlapping columns between each row of the result and the individual $RD_i$ and to return to each query the result it is supposed to get. To achieve this, the parsing algorithm performs a Boolean intersection between each row of result and each $RD_i$. If the columns of this row corresponding to those columns of $RD_i$ are not null, the algorithm distributes the corresponding part of this row to $Q_i$ as one of its query answers. This repeats on every row and every $Q_i$ that composed the Type 2 query. The parsing on the results of $Q_{OPT}$ only requires a linear scan on the results to the rewritten query. Therefore, it can be done on-the-fly as the results of $Q_{OPT}$ is streamed out from the evaluation.

Exemplary embodiments of cost models for SPARQL MQO in accordance with the present invention are configured based on the way in which a SPARQL query is evaluated on popular RDF stores. This includes a well justified principle that the most selective triple patterns are evaluated first and that the $GP_{OPT}$ clause is always evaluated on the result of GP due to the fact that the $GP_{OPT}$ is a left-join. This suggests that a good optimization should keep the result cardinality from the common sub-query as small as possible for two reasons. The first reason is that the result cardinality of a Type 2 SPARQL query is upper bound by result cardinality of its GP clause since $GP_{OPT}$s are simply left-joins. The second reason is that the intermediate result from evaluating the GP clause is typically not well indexed, which implies that a non-selective GP will result in significant more efforts in processing the $GP_{OPT}$s.

Regarding the selectivity estimation for the conjunctive Basic Graph Patterns (BGP), given a triple pattern t=(s p o), where each entry could be bound or unbound, its selectivity is estimated by sel(t)=sel(s)×sel(p)×sel(o). sel is the selectivity estimation function, whose value falls in the interval of [0, 1]. In particular, for an unbound variable, its selectivity equals 1. For bound variables and constants, depending on whether it is a subject, predicate or object, different methods are used to implement sel. Notice that the formula implicitly assumes statistical independence for the subject, predicate and object and, therefore, is an approximation. Pre-computed statistics of the dataset are also required. For a join between two triple patterns, independence assumption is also adopted. However, in practice, such estimation is not accurate enough for optimizing complex queries. The culprit comes from the fact that as the number of joins increases, the accuracy of the estimated selectivity drops quickly, resulting in a very loose estimation.

With the above limitations in mind, a cost function for conjunctive SPARQL query is used that roots on the well justified principle in query optimization that the selective triple patterns have higher priorities in evaluation. In accordance with the present invention:

$$\text{Cost}(Q) = \begin{cases} \text{Min}(sel(t)) & Q \text{ is a Type 1 query}, t \in GP \\ \text{Min}(sel(t)) + \Delta & Q \text{ is a Type 2 query}, t \in GP \end{cases} \quad (1)$$

For a Type 1 conjunctive query, Equation 1 returns the selectivity for the most selective triple pattern in the query graph GP as the cost of evaluating Q. For a Type 2 query, the cost is the summation of the cost on evaluating the common graph pattern GP and the cost on the evaluating the OPTIONALs, i.e., the cost denoted by Δ. Backed by a comprehensive empirical study on three different RDF query engines, it is extrapolated that Δ is a hidden function of the cost of GP, the number of OPTIONALs and the cost of the query pattern of each $GP_{OPT}$. However, when the cost of GP is small (being selective), Δ would be a trivial value and Cost(Q) is mostly credited to the evaluation of GP. Hence, Cost(Q) is approximated with the cost of GP in such cases. Using the cost model of the present invention to choose a good common substructure can consistently improve the performance of query evaluation over the pure structure-based optimization, i.e., without considering the evaluation cost of common sub-queries, on different RDF stores.

The proposed cost function requires using the pre-computed statistics of the RDF dataset to estimate the selectivity of triple patterns. Therefore, some statistics are summarized from the dataset. This includes building the histogram for distinct predicates in the dataset. In addition, for each disparate predicate, histograms are built for the subjects and objects attached to this predicate in the dataset. In practice, for some RDF stores, like Jena, part of such statistics, e.g., the histogram of predicates, is provided by the SPARQL query optimizer and is accessible for free. For the others, e.g., Virtuoso and Sesame, the statistics of the dataset are collected in a preprocessing step.

The results of the algorithm of the present invention can be evaluated for completeness and soundness. Regarding completeness, suppose a Type 2 rewritten query $Q_{OPT}$ optimizes a set of n Type 1 queries, i.e., $Q=\{Q_1, Q_2, \ldots, Q_n\}$. Without loss of generality, denote the common relation, i.e., the common sub-query, used in $Q_{OPT}$ as GP and its outer join relations, i.e., the OPTIONALs as $GP_i$ (i=1, 2, ..., n).

As only conjunctive queries are considered as input, hence by construction $Q = \cup_{i=1}^{n} GP \bowtie GP_i$ and $Q_{OPT} = \cup_{i=1}^{n} GP \ltimes GP_i$. By the definition of left outer join $\ltimes$, $GP \bowtie GP_i \subseteq GP \ltimes GP_i$ for any i. It follows $Q \subseteq Q_{OPT}$ in terms of query results.

Soundness guarantees $Q \supseteq Q_{OPT}$. This is achieved by evaluating the results from $Q_{OPT}$ and distributing the matched results to correspondent queries in Q. As such, false positives are discarded and the remaining are valid bindings for one or more graph patterns in Q. Therefore, $Q \supseteq Q_{OPT}$ in terms of results after the refining step. Completeness and soundness together guarantee that the final answers resulted by the MQO techniques of the present invention are equivalent to the results from evaluating queries in Q independently.

For the ease of presentation, the input queries discussed so far are Type 1 queries using constants as their predicates. With some minimal modifications to the algorithm and little preprocessing of the input, the exemplary embodiment of the algorithm listed above can optimize more general SPARQL queries. Two simple yet useful extensions are optimizing input queries with variables as the predicates and optimizing input queries of Type 2, i.e., with OPTIONALs.

Variable predicates are treated slightly differently from the constant predicates when identifying the structural overlap of input queries. Basically, a variable predicate from one query can be matched with any variable predicate in another query. In addition, each variable predicate of a query will correspond to one variable vertex in the linegraph representation, but the main flow of the MQO algorithm remains the same.

Figure 5:
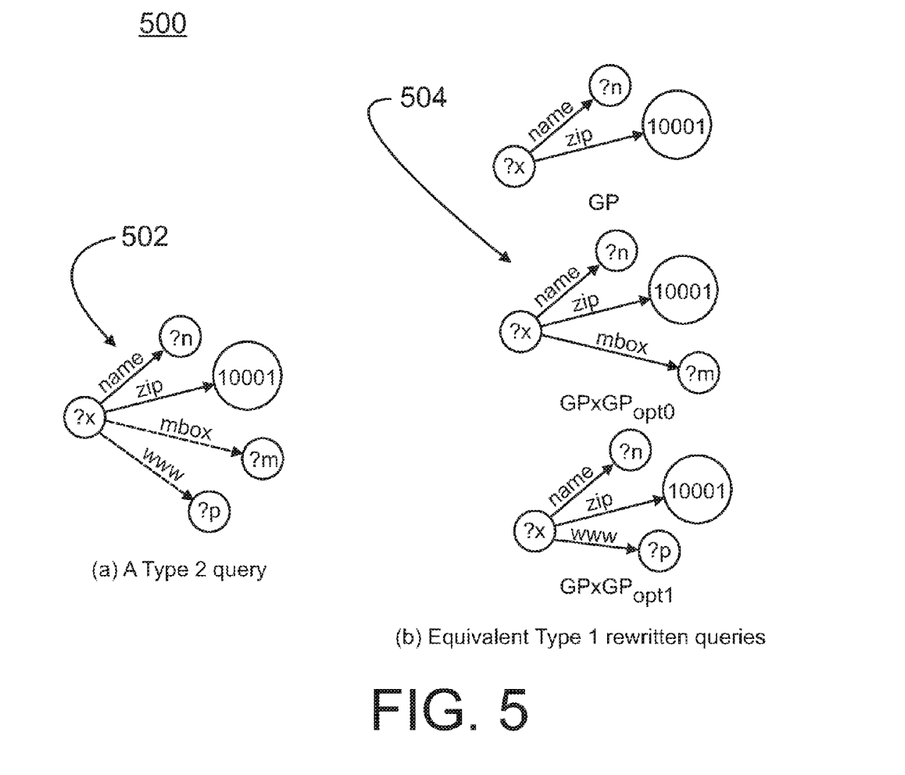
FIG. 5 is an embodiment of a clustered query created from the equivalent input queries.

For TYPE 2 queries, the MQO algorithm takes a batch of Type 1 SPARQL queries as input and rewrites them to another batch of Type 1 and Type 2 queries. It can be extended to optimize a batch of input queries with both Type 1 and Type 2 queries. To this end, it requires a preprocessing step on the input queries. Specifically, by the definition of left-join, a Type 2 input query will be rewritten into its equivalent Type 1 form, since our MQO algorithm only works on Type 1 input queries. The equivalent Type 1 form of a Type 2 query GP (OPTIONAL $GP_{OPT}$)$^+$) include a two sets of queries, a Type 1 query solely using the GP as its query graph pattern and the queries by replacing the left join(s) with inner join(s) between GP and each of the $GP_{OPT}$ from the OPTIONAL, i.e., $\cup GP \bowtie GP_{OPT}$. Referring to FIG. 5, an example of a comparison 500 of a Type 2 query 502 to its equivalent Type 1 form 504 is provided. Stripping off the OPTIONALs in the Type 2 query 502 and applying the above preprocessing results in the group of three Type 1 rewritings 504 illustrated.

By applying the above transformation to all Type 2 queries in the input and then passing the batch of queries to the exemplary embodiment of the algorithm provided above for optimization, Type 2 queries are handled seamlessly. The result to the original Type 2 query can be generated through the union of the results, produced by the MQO algorithm of the present invention, from the transformed Type 1 queries.

In accordance with one exemplary embodiment, the present invention is directed to a system for multi-query optimization (MQO) over a given data set such as SPARQL queries over RDF data. The system provides for MQO based on both structural similarities among the input data queries and the realized cost savings associated with a given query cluster combination. The system includes one or more databases in communication with a network. Suitable databases are known and available in the art. The database includes an input query set containing a plurality of input queries over the given data set across the network. Each query is configured as a graph pattern that is to be match to the data set. Each graph pattern includes at least one subject node, predicate edge and object node triple and can include multiple subject, predicate, object triples. In one embodiment, the queries are SPARWL queries and the data set is a RDF data set including, for example, RDF formulated data accessible across the network including local area networks and wide area networks such as the world wide web.

Also included is a computing system in communication with the database and the given dataset stored on the database. Suitable computing systems are known in the art and include single computers, servers and distributed computing systems. The computing system executes all of the application and computer code required to provide the MQO and searching functionalities in accordance with the present invention. The computing system includes a clustering module that is executed to cluster the plurality of input queries though incremental pair-wise merging based on structural similarities between graph patterns and query search cost optimization realized by a given merged graph pattern to generate an optimized query set comprising at least one query cluster.

In one embodiment, the clustering module is used to identify a plurality of candidate merger inputs from the set of input queries. Each candidate merger input can be either an input query or an existing query cluster resulting from a previous pair-wise merging of input queries. In addition, each candidate merger input has a merger input graph pattern and a set of predicate edges contained in the merger input graph pattern. The cluster module is used to select a pair of merger inputs from the plurality of candidate merger inputs such that the selected pair of merger inputs have a maximum overlap in the sets of predicate edges associated with the selected pair of merger inputs, i.e., the maximum number of predicate edges in common. In order to determine this overlap, the clustering module includes a Jaccard similarity comparison module to calculate, to identify and to select the pair of merger inputs having a highest Jaccard similarity between the associated sets of predicate edges.

The clustering module includes a linegraph module that is used to create a linegraph node for each predicate edge in the set of predicate edges associated with the merger input. In order to create the linegraphs, one for each merger input graph patter, the linegraph module provides the functionality to identify pairs of linegraph nodes where for each identified pair of linegraph nodes the subject node or object node contained in the merger input graph pattern and connected by a first predicate in that identified pair of linegraph nodes and the subject node or object node contained in the merger input graph pattern and connected by a second predicate in that identified pair of linegraph nodes comprise a common variable. Linegraph edges are contained in the linegraph between each identified pair of linegraph nodes to define the linegraph for each merger input in the selected pair of merger inputs.

The linegraph module also provides for reducing the number of nodes in the generated linegraphs and using structural similarities among the nodes and edges of the generated linegraphs to determine if the merger input graphs patterns associated with the linegraphs should be merged. The linegraph module creates a pair of linegraph edges extending in opposite directions between each identified pair of linegraph nodes. Each linegraph edge in a given pair of linegraph edges has a label identifying a location of the common variable in the subject nodes and object nodes contained in the merger input graph pattern and connected by the predicates in that identified pair of linegraph nodes and a direction in which that linegraph edge extends between the linegraph nodes. Each linegraph node has an associated a set of labels with each linegraph node where each set of labels includes labels for all linegraph edges associated with a given linegraph node. Sets of labels having less than a pre-determined threshold level of similarity with all other sets of labels are identified by the linegraph module which then removes the linegraph nodes associated with the identified sets of labels from the linegraphs. The linegraph module also creates pairs of linegraph nodes by selecting a linegraph node from each linegraph and determining an intersection between sets of labels associated with each created pair of linegraph nodes. Then all determined intersections are used to determine if the merger input graph patterns associated with the linegraphs should be merged.

The clustering module further includes a product graph module that is used to combine the linegraphs generated for each merger input into a single product graph having a unique node for each combination of nodes from the linegraphs. Each unique node in the single product graph contains only pairs of nodes selected from each linegraph that correspond to an identical predicates in the merger input graph patterns. Linegraph edges between each identified pair of linegraph nodes include a pair of linegraph edges extending in opposite directions between each identified pair of linegraph nodes. Each linegraph edge in a given pair of linegraph edges has a label identifying a location of the common variable in the subject nodes and object nodes contained in the merger input graph pattern and connected by the predicates in that identified pair of linegraph nodes and a direction in which that linegraph edge extends between the linegraph nodes. In addition, each linegraph node has an associating a set of labels where each set of labels includes labels for all linegraph edges associated with a given linegraph node. The product graph module is used to combine the set of labels for the identified pairs of nodes corresponding to identical predicates in the single product graph.

The clustering module includes a clique module that is used to identify a largest clique in the single product graph. This largest clique corresponds to a largest combined graph pattern obtainable from the merger input graph patterns of the selected pair of merger inputs, from which the linegraphs and product graph where obtained. The clustering module uses a size of the largest clique to determine if the selected pair of merger inputs has sufficient structural similarities. The clustering module is also used to identify a plurality of candidate combined graph patterns obtainable from the merger input graph patterns if the largest combined graph pattern exceeds a predetermined size. Each candidate combined graph pattern is smaller than the largest combined graph pattern and represents a unique overlapping of the merger input graph patterns. The clustering module associates a search cost optimization realization level with each candidate combined graph pattern and selects the candidate combined graph pattern representing a most cost effective balance of merger input graph pattern overlap and search cost optimization realization level. The selected candidate combined graph pattern generates the optimized query set.

The computing system further has a query evaluation module to evaluate the optimized query set over the data set to generate a set of query answers and to parse and distribute, i.e., deliver, the set of query answers to the input queries in the input query set, as the query results from the optimized query are superset of the query results of the input queries.

In one embodiment, each input query a set of predicate edges contained in its graph pattern, and the computing system includes a partitioning module to performing an initial rough grouping of the input data queries based on predicate similarity by identifying input queries having sufficiently similar sets of predicate edges and partitioning the input query set into a plurality of groups. Each group includes input queries having sufficiently similar sets of predicate edges. In addition, the clustering module is configured to cluster the input queries from one of the plurality of groups. Preferably, the partitioning module is a Jaccard similarity comparison module that identifies input queries having sufficiently similar sets of predicate edges using Jaccard similarity between sets of predicates edges to identify the input queries.

The present invention is also directed to a method for multi-query optimization. This method comprising uses structural similarities and cost savings considerations to create an optimized query set from an input query set. The optimized query set contains both original input queries and query clusters. Preferably, the queries are SPARQL queries and the data sets are RDF datasets. In this method, an input query set containing a plurality of input queries over a given data set is identified. Each query has a graph pattern with at least one subject node, predicate edge and object node triple, i.e., it is a patent matching query over the data set.

The plurality of input queries are clustered, i.e., combined, through incremental pair-wise merging based on structural similarities between graph patterns and query search cost optimization realized by a given merged graph pattern to generate an optimized query set containing at least one query cluster. In order to cluster the plurality of input queries, a plurality of candidate merger inputs are identified. Each candidate merger input is either an input query or an existing query cluster resulting from a previous pair-wise merging. In addition, each candidate merger input contains a merger input graph pattern and a set of predicate edges contained in the merger input graph pattern. A pair of merger inputs is selected from the plurality of candidate merger inputs, to provide for pair-wise merging. The selected pair of merger inputs has a maximum overlap in the sets of predicate edges associated with the selected pair of merger inputs. Therefore, the process in accordance with the present invention looks for pairs that have a highest likelihood of providing significant structural overlap for purposes or merging and consolidating the queries through common sub-query identification. Preferably, the pair of merger inputs is selected that has the highest Jaccard similarity between the associated sets of predicate edges.

Having identified the merger inputs, the graph patterns for each merger input are converted to linegraphs. Each linegraph is created by creating a linegraph node for each predicate edge in the set of predicate edges associated with the merger input. The graph pattern and linegraph represent a graph inversion in that the edges in the graph pattern (predicates) are the nodes in the linegraph. Having identified the nodes, the nodes are connected by edges by identifying pairs of linegraph nodes where for each identified pair of linegraph nodes the subject node or object node contained in the merger input graph pattern and connected by a first predicate in that identified pair of linegraph nodes and the subject node or object node contained in the merger input graph pattern and connected by a second predicate in that identified pair of linegraph nodes comprise a common variable. For example, the common variables can be found in the subject node of a first predicate and the object node of a second predicate. Linegraph edges are created between each identified pair of linegraph nodes.

Again to increase the likelihood of finding pairs or queries or clusters that will have significant structural overlap and to increase computational efficiency by only conducting more computationally expensive procedures on the most promising pairs, the number of nodes in the generated linegraphs, i.e., the size of each linegraph, is reduced. In addition, structural similarities among the nodes and edges of the generated linegraphs are used to determine if the merger input graphs patterns associated with the linegraphs should be merged. In one embodiment, a set of labels is associated with each linegraph node. Each set of labels includes labels for all linegraph edges associated with a given linegraph node. Sets of labels having less than a pre-determined threshold level of similarity with all other sets of labels are identified, and the linegraph nodes associated with the identified sets of labels are removed from the linegraphs. In addition, pairs of linegraph nodes are created by selecting a linegraph node from each linegraph. An intersection between sets of labels associated with each created pair of linegraph nodes is determined, and all determined intersections are used to determine if the merger input graph patterns associated with the linegraphs should be merged.

The linegraphs generated for each merger are combined input into a single product graph having a unique node for each combination of nodes from the linegraphs. To create this product graph, pairs of nodes to combine into a given unique node in the single product graph are identified by selecting a single node from each linegraph that corresponds to an identical predicate in the merger input graph pattern associated with the linegraph containing that identified single node. Only the identified pairs of nodes corresponding to identical predicates are used in the single product graph. So, a product graph is created using the limitation that only nodes from common predicates in the underlying merger input pattern graphs are used. Using the labels associated with the edges between each linegraph node, the set of labels for the identified pairs of nodes corresponding to identical predicates in the single product graph are combined.

Having created the product graph for two linegraphs, the largest clique in the single product graph is identified. This largest clique represents the largest combined graph pattern obtainable from the merger input graph patterns of the selected pair of merger inputs. Based on the size of the largest clique, a determination is made regarding whether the selected pair of merger inputs has sufficient structural similarities. Even given sufficient structural overlap, the maximum overlap must not be the most cost effective overlap for purposes of query evaluation. Cost, and therefore, cost savings, can be measured according to any desirable metric, including, but not limited to economic cost, computing resource utilization, evaluation time and accuracy. Therefore, a plurality of candidate combined graph patterns obtainable from the merger input graph patterns is identified if the largest combined graph pattern exceeds a predetermined size. Each candidate combined graph pattern is smaller than the largest combined graph pattern and represents a unique overlapping of the merger input graph patterns. A desired search cost optimization realization level is associated with each candidate combined graph pattern, and the candidate combined graph pattern representing the most cost effective balance of merger input graph pattern overlap and search cost optimization realization level is selected. The selected candidate combined graph pattern is added to or used to generate the optimized query set, e.g., by creating a cluster, which can then be used in a subsequent pair-wise merger.

The optimized query set is evaluated over the data set to generate a set of query answers. As this set of query answers represents a superset of answers to the original set of input queries and may contain artifacts not responsive to the original input queries, the set of query answers is parsed and distributed to the appropriate input queries in the input query set.

Additional efficiency in the clustering process can be achieved through a preliminary sorting and grouping of the input queries according to the overlap in their predicate groups, as the predicates are used to identified structural similarities in the query graphs. Therefore, input queries having sufficiently similar sets of predicate edges are identified, and the input query set is partitioned into a plurality of groups. Each group contains input queries having sufficiently similar sets of predicate edges. Clustering is then conducted group by group, as input queries in different groups are unlikely to have sufficient structural overlap. Preferably, Jaccard similarity between sets of predicates edges is used to identify the input queries.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for multi-query optimization for example using SPARQL over resource description framework datasets in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A system for multi-query optimization over a given data set, the system comprising:
    a hardware memory comprising a database in communication with a network, the database comprising an input query set comprising a plurality of input queries over the given data set across the network, each input query comprising a graph pattern comprising at least one subject node, predicate edge and object node triple and a set of predicate edges contained in its graph pattern; and
    a computing system in communication with the database and the given dataset, the computing system comprising:
    a computer processor;
    a clustering module to cluster the plurality of input queries through incremental pair-wise merging based on structural similarities between graph patterns and query search cost optimization realized by a given merged graph pattern to generate an optimized query set comprising at least one query cluster; and
    a partitioning module to identify input queries having sufficiently similar sets of predicate edges and to partition the input query set into a plurality of groups, each group comprising input queries having sufficiently similar sets of predicate edges;
    wherein the clustering module clusters the plurality of input queries by using linegraphs, each linegraph comprising:
        linegraph nodes, each linegraph node corresponding to a given predicate edge in the input queries;
        linegraph edges between pairs of linegraph nodes that are associated with predicate edges sharing at least one of a common subject node and a common object node in the input queries; and
        a label associated with each linegraph edge and indicating a type of join between subject nodes and object nodes;
    and the clustering module is configured to cluster the input queries from one of the plurality of groups.

2. The system of claim 1, wherein the clustering module is further configured:
    to identify a plurality of candidate merger inputs, each candidate merger input comprising an input query or an existing query cluster resulting from a previous pairwise merging, a merger input graph pattern and a set of predicate edges contained in the merger input graph pattern; and
    to select a pair of merger inputs from the plurality of candidate merger inputs having a maximum overlap in the sets of predicate edges associated with the selected pair of merger inputs.

3. The system of claim 2, wherein the clustering module comprises a Jaccard similarity comparison module to select the pair of merger inputs having a highest Jaccard similarity between the associated sets of predicate edges.

4. The system of claim 2, wherein the clustering module comprises a linegraph module to:
    create the linegraph node for each predicate edge in the set of predicate edges associated with the merger input;
    identify pairs of linegraph nodes where for each identified pair of linegraph nodes the subject node or object node contained in the merger input graph pattern and connected by a first predicate in that identified pair of linegraph nodes and the subject node or object node contained in the merger input graph pattern and connected by a second predicate in that identified pair of linegraph nodes comprise a common variable; and
    create the linegraph edges between each identified pair of linegraph nodes to define the linegraph for each merger input in the selected pair of merger inputs.

5. The system of claim 4, wherein the linegraph module is further configured to:
    reduce a number of nodes in the generated linegraphs; and
    using structural similarities among the nodes and edges of the generated linegraphs to determine if the merger input graphs patterns associated with the linegraphs should be merged.

6. The system of claim 5, wherein the linegraph module is further configured to:
    create a pair of linegraph edges extending in opposite directions between each identified pair of linegraph nodes, each linegraph edge in a given pair of linegraph edges comprising a label identifying a location of the common variable in the subject nodes and object nodes contained in the merger input graph pattern and connected by the predicates in that identified pair of linegraph nodes and a direction in which that linegraph edge extends between the linegraph nodes;
    associate a set of labels with each linegraph node, each set of labels comprising labels for all linegraph edges associated with a given linegraph node;
    identify sets of labels having less than a pre-determined threshold level of similarity with all other sets of labels; and
    remove the linegraph nodes associated with the identified sets of labels from the linegraphs.

7. The system of claim 5, wherein the linegraph module is further configured to:
    create linegraph edges between each identified pair of linegraph nodes further comprises creating a pair of linegraph edges extending in opposite directions between each identified pair of linegraph nodes, each linegraph edge in a given pair of linegraph edges comprising a label identifying a location of the common variable in the subject nodes and object nodes contained in the merger input graph pattern and connected by the predicates in that identified pair of linegraph nodes and a direction in which that linegraph edge extends between the linegraph nodes;

associate a set of labels with each linegraph node, each set of labels comprising labels for all linegraph edges associated with a given linegraph node;

create pairs of linegraph nodes by selecting a linegraph node from each linegraph;

determine an intersection between sets of labels associated with each created pair of linegraph nodes; and use all determined intersections to determine if the merger input graph patterns associated with the linegraphs should be merged.

8. The system of claim 4, wherein the clustering module further comprising a product graph module to combine the linegraphs generated for each merger input into a single product graph comprising a unique node for each combination of nodes from the linegraphs.

9. The system of claim 8, wherein each unique node in the single product graph comprises only pairs of nodes selected from each linegraph that correspond to an identical predicates in the merger input graph patterns.

10. The system of claim 9, wherein linegraph edges between each identified pair of linegraph nodes comprise a pair of linegraph edges extending in opposite directions between each identified pair of linegraph nodes, each linegraph edge in a given pair of linegraph edges comprising a label identifying a location of the common variable in the subject nodes and object nodes contained in the merger input graph pattern and connected by the predicates in that identified pair of linegraph nodes and a direction in which that linegraph edge extends between the linegraph nodes;

each linegraph node comprises an associated a set of labels, each set of labels comprising labels for all linegraph edges associated with a given linegraph node; and product graph module is further configured to combine the set of labels for the identified pairs of nodes corresponding to identical predicates in the single product graph.

11. The system of claim 8, wherein clustering module further comprises a clique module to identify a largest clique in the single product graph, the largest clique comprising a largest combined graph pattern obtainable from the merger input graph patterns of the selected pair of merger inputs;

the clustering module configured to use a size of the largest clique to determine if the selected pair of merger inputs comprise sufficient structural similarities.

12. The system of claim 11, wherein clustering module is further configured to:

identify a plurality of candidate combined graph patterns obtainable from the merger input graph patterns if the largest combined graph pattern exceeds a predetermined size, each candidate combined graph pattern smaller than the largest combined graph pattern and representing a unique overlapping of the merger input graph patterns;

associate a search cost optimization realization level with each candidate combined graph pattern;

select the candidate combined graph pattern representing a most cost effective balance of merger input graph pattern overlap and search cost optimization realization level; and use the selected candidate combined graph pattern to generate the optimized query set.

13. The system of claim 1, the computing system further comprising a query evaluation module to:

evaluate the optimized query set over the data set to generate a set of query answers; and parse and distribute the set of query answers to the input queries in the input query set.

14. The system of claim 1, wherein the input queries comprise SPARQL queries and the data set comprises a resource description framework dataset.

15. The system of claim 1, wherein partitioning module comprises a Jaccard similarity comparison module to identify input queries having sufficiently similar sets of predicate edges using Jaccard similarity between sets of predicates edges to identify the input queries.

16. A system for multi-query optimization over a given data set, the system comprising:

a hardware memory comprising a database in communication with a network, the database comprising an input query set comprising a plurality of input queries over the given data set across the network, each input query comprising a graph pattern comprising at least one subject node, predicate edge and object node triple; and a computing system in communication with the database and the given dataset, the computing system comprising a computer processor and a clustering module to cluster the plurality of input queries through incremental pair-wise merging based on structural similarities between graph patterns and query search cost optimization realized by a given merged graph pattern to generate an optimized query set comprising at least one query cluster by:

identifying a plurality of candidate merger inputs, each candidate merge input comprising an input query or an existing query cluster resulting from a previous pair-wise merging, a merger input graph pattern and a set of predicate edges contained in the merger input graph pattern; and selecting a pair of merger inputs from the plurality of candidate merger inputs having a maximum overlap in the sets of predicate edges associated with the selected pair of merger inputs;

wherein the clustering module clusters the plurality of input queries by using linegraphs, each linegraph comprising:

linegraph nodes, each linegraph node corresponding to a given predicate edge in the input queries;

linegraph edges between pairs of linegraph nodes that are associated with predicate edges sharing at least one of a common subject node and a common object node in the input queries; and a label associated with each linegraph edge and indicating a type of join between subject nodes and object nodes.

\* \* \* \* \*